U S011167705B2

United States Patent
Frost et al.

(10) Patent No.: US 11,167,705 B2
(45) Date of Patent: Nov. 9, 2021

(54) VEHICLE COMPONENT FOR A VEHICLE

(71) Applicant: Benteler Automobiltechnik GmbH, Paderborn (DE)

(72) Inventors: Georg Frost, Steinheim (DE); Mathias Lohberg, Altenbeken (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 134 days.

(21) Appl. No.: 16/693,628

(22) Filed: Nov. 25, 2019

(65) Prior Publication Data

US 2020/0164818 A1 May 28, 2020

(30) Foreign Application Priority Data

Nov. 26, 2018 (DE) ...................... 10 2018 129 725.4

(51) Int. Cl.
| | |
|---|---|
| *B60R 19/03* | (2006.01) |
| *B62D 21/15* | (2006.01) |
| *B60R 19/18* | (2006.01) |
| *B60R 19/02* | (2006.01) |
| *B62D 29/00* | (2006.01) |
| *B62D 25/00* | (2006.01) |
| *B62D 25/04* | (2006.01) |

(52) U.S. Cl.
CPC ............ *B60R 19/03* (2013.01); *B60R 19/023* (2013.01); *B60R 19/18* (2013.01); *B62D 21/152* (2013.01); *B60R 2019/1826* (2013.01); *B62D 21/15* (2013.01); *B62D 25/00* (2013.01); *B62D 25/04* (2013.01); *B62D 29/007* (2013.01)

(58) Field of Classification Search
CPC ....... B60R 19/03; B60R 19/023; B60R 19/18; B60R 2019/1826; B62D 21/152; B62D 25/04; B62D 29/007; B62D 21/15; B62D 25/00
USPC ..................................... 296/193.09
See application file for complete search history.

(56) References Cited

U.S. PATENT DOCUMENTS

| | | | | |
|---|---|---|---|---|
| 6,820,924 | B2 * | 11/2004 | Caliskan ................ | B62D 21/15 188/377 |
| 7,188,890 | B1 * | 3/2007 | Baccouche .......... | B62D 21/152 293/133 |
| 2004/0201256 | A1 | 10/2004 | Caliskan et al. | |

FOREIGN PATENT DOCUMENTS

DE          69110872 T2     2/1996

\* cited by examiner

*Primary Examiner* — D Glenn Dayoan
*Assistant Examiner* — Dana D Ivey
(74) *Attorney, Agent, or Firm* — Holland & Hart LLP

(57) ABSTRACT

A vehicle component for a vehicle has a component body which is formed from a core material. The component body has a localized deformation zone which extends flat in the core material, and the deformation zone has a locally variable tensile strength according to a predetermined tensile strength profile configured to influence a deformation profile of the component body upon a force acting on the component body.

16 Claims, 6 Drawing Sheets

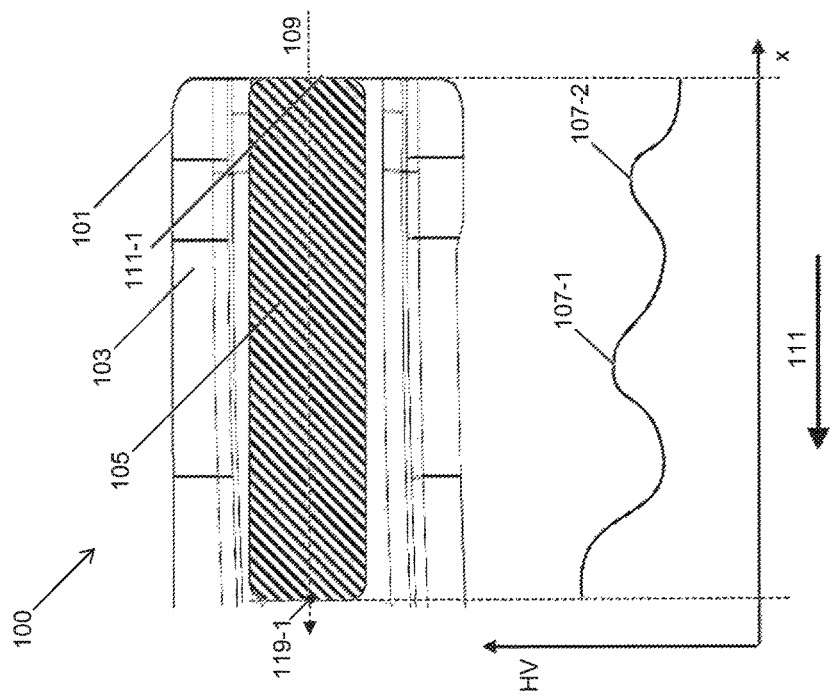
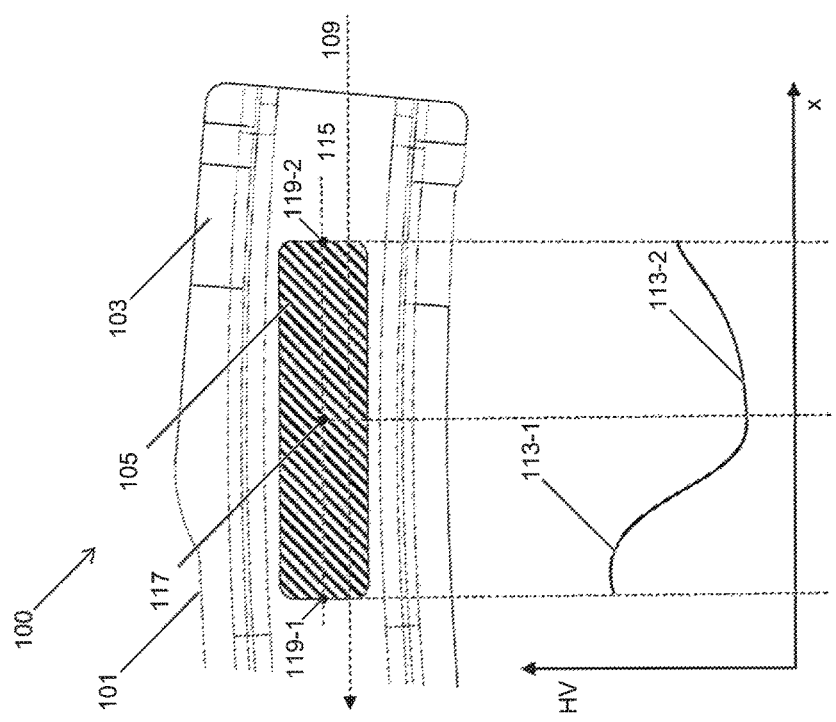

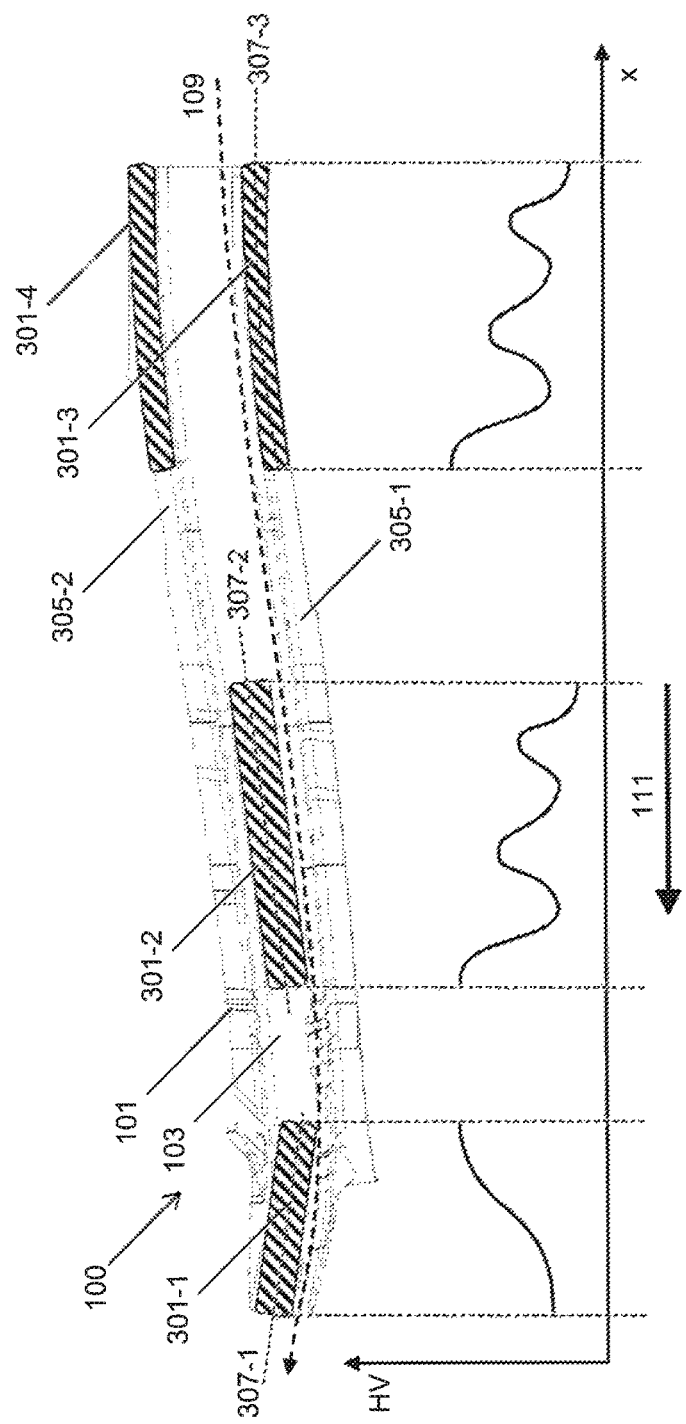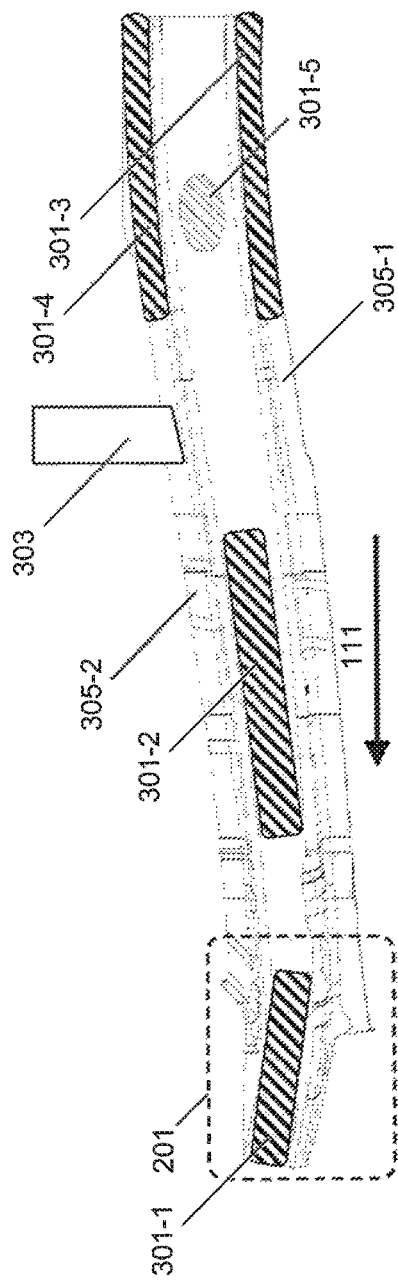
Fig. 3A
Fig. 3B

VEHICLE COMPONENT FOR A VEHICLE

CROSS-REFERENCE TO RELATED APPLICATION

The present application claims the benefit of German Patent Application No. 10 2018 129 725.4, filed on 26 Nov. 2018, entitled "Fahrzeugbauteil für ein Fahrzeug," and assigned to the present Applicant. This application is incorporated herein by reference for all purposes.

BACKGROUND

The present disclosure relates to a vehicle component for a vehicle, in particular for a motor vehicle.

The vehicle component may in particular be part of a vehicle body and determine the mechanical properties, for example a deformation of the vehicle body in the event of a force acting on the vehicle body. Furthermore, the vehicle component may have deformation regions which may have a reduced material hardness in order to concentrate a deformation of the vehicle component on these deformation regions. In particular, this allows the direction of the deformation to be controlled and/or cracks in the vehicle component to be avoided. Accordingly, with the deformation regions a change in the geometry of the vehicle component can be predetermined at an acting force. However, with the known vehicle components, the temporal profile of the deformation or of the energy absorption by the vehicle component in the case of an external force acting on the vehicle component cannot be predetermined.

SUMMARY

It is the object of the present disclosure to provide a more efficient vehicle component, which is in particular adapted to realize a predetermined temporal and/or geometric deformation behavior of the vehicle component when a force is applied to the vehicle component.

This object is solved by the features of the independent claim. Advantageous examples are subject of the dependent claims, the description and the accompanying figures.

The present disclosure is based on the finding that the above object is achieved by a vehicle component which has a deformation zone with a tensile strength profile, in particular with a flat tensile strength topography. The tensile strength profile describes a local change in the tensile strength within the deformation zone, wherein differently sized tensile strength gradients in the deformation zone can be realized in different spatial directions. Correspondingly, a predetermined deformation behavior of the vehicle component can already be realized with a single, deformation-resistant deformation zone.

In particular, the deformation zone at force introduction points of the vehicle component may have a low material hardness, and with increasing distance from the force introduction points, the material hardness in the deformation zone may increase. As a result, the deformation behavior of the vehicle component, in particular a concertina-like folding, buckling and/or bending and/or its respective temporal development, can be predetermined.

According to a first aspect, the disclosure relates to a vehicle component for a vehicle having a component body, which is formed from a core material and has a localized deformation zone, which is arranged flat in the core material. The deformation zone has a locally variable tensile strength according to a predetermined tensile strength profile in order to influence a deformation profile of the component body when a force is applied to the component body.

The vehicle component may be a thermoformed vehicle component, in particular made of a hardenable steel alloy, for example manganese-boron steel. Further, the vehicle component may include an A-pillar, a roof frame member, an inner reinforcement of the roof frame, a longitudinal beam, an inner reinforcement of the longitudinal beam, a fender panel, a beam, a diagonal strut, a vertical strut, an end wall, a tunnel in an underbody, a seat cross beam, a joist, a heel plate, a side sill, a B-pillar, a C-pillar, a roof cross beam, a seat back, seat and/or a seat edge.

Furthermore, the vehicle component may be a, in particular partially hardened, axle part, wherein the axle part may have predetermined bending points. These predetermined bending points can be realized, for example, by means of the deformation zone or formed by the deformation zone.

Furthermore, the vehicle component may be made of steel, in particular a UHSS steel, aluminum, an aluminum alloy or a composite material. The deformation zone can be generated for example by a local heat treatment of the component body. By the heat treatment, the tensile strength can be adjusted within the deformation zone. For example, a gradual, continuous or stepped adaptation of the tensile strength can be realized. The deformation zone can be arranged in a flat surface of the component body and/or extend over edges, bends and/or recesses of the component body. A shaping of the component body can take place during or after the introduction of the deformation zone.

The core material of the component body may in particular be a homogeneous sheet metal material which has homogeneous properties, in particular material composition, elasticity and/or material hardness, over a sheet thickness of the component body.

In one example, the component body has a body surface, wherein on the body surface, a coating can be applied, which is adapted to prevent corrosion after production and/or high temperature oxidization during a thermoforming process for producing the component body. On the body surface, for example, a metallic coating, in particular an aluminum-silicon alloy can be applied, which forms a stable alloy layer system with the core material in the thermoforming process. Accordingly, the body surface with the formed alloy layer system can form a corrosion and/or high temperature oxidization protection of the component body.

In one example, the component body is formed from at least two mutually joined sheet metal blanks. The component body may in particular be a tailored blank or be formed from a tailored blank, and be composed accordingly of sheet metal blanks, which may have different material qualities, sheet thicknesses and/or materials. Furthermore, the joined sheet metal blanks may have overlapping regions in which the sheet metal blanks are arranged overlapping, in particular joined. Furthermore, a reinforcing plate can be arranged on the joining regions or a reinforcing plate can be formed by the joining region.

The component body may extend longitudinally in a longitudinal direction, wherein the deformation zone may be formed to control a deformation of the component body when a force acts parallel to the longitudinal direction. For example, a multi-step folding of the component body can be realized. A temporal and local predetermination of the folding can be realized by an adaptation of the tensile strength profile of the deformation zone. Local tensile strength minima within the deformation zone with a lower tensile strength may allow deformation of the component body before local tensile strength maxima with a higher tensile strength allow further deformation of the component body.

The deformation zone can be arranged at the expected force introduction points of the component body in the event of an impact of the vehicle in order to realize a force absorption and correspondingly a deformation in the deformation zone. Regions of the component body outside the deformation zone may experience less or no deformation. Along the longitudinal direction of the component body further deformation zones can be arranged with increasing tensile strength.

Further, a plurality of separate deformation zones may be arranged in a first portion of the component body, which have a comparable tensile strength profile. In a second section, which is offset along the longitudinal direction relative to the first section, further separate deformation zones with a further tensile strength profile can be arranged. An average value of the tensile strength profile of the further deformation zones in the second section may be greater than an average value of the tensile strength profile of the deformation zones in the first section. The deformation zones in the respective section can be arranged centrally or partially spaced from an axis of symmetry of the component body.

The component body extends axially along the longitudinal direction, wherein the longitudinal direction may have a curved course, which follows the geometry of the component body. Furthermore, the longitudinal direction can coincide with an axis of symmetry and/or a main extension direction of the component body.

A local tensile strength change rate of the deformation zone may in particular be continuous, so that tensile strength jumps are not formed in the deformation zone and transitions between regions of different tensile strength have a gradual change. At a zone transition of the deformation zone to the core material of the component body surrounding the deformation zone, the tensile strength may correspond to a tensile strength of the core material, wherein the tensile strength may decrease with increasing distance from the zone transition towards a center of the deformation zone. Further, the local rate of change of tensile strength may increase from the zone transition to the zone center and may decrease as the zone center is reached, in particular to realize a steady course of tensile strength at the center.

In one example, at least two tensile plateaus are formed in the deformation zone, which have different tensile strengths, in particular tensile strength courses, relative to one another and with respect to the core material. As a result, the advantage is achieved that a temporal and/or local deformation behavior can be controlled within the deformation zone. For example, regions of lower tensile strength may deform temporally before regions of increased tensile strength upon application of force.

Furthermore, a gradual increase in the tensile strength within the deformation zone as the distance from a force introduction point increases, can attenuate a deformation progress. In particular, the structural integrity of the component body can be obtained after an initial deformation.

In one example, the component body may be made of steel core material having a tensile strength $R_{M,K}$ in a range of 1200 MPa to 2200 MPa, the deformation zone having a tensile strength $R_{M,D}$ in a range of 450 MPa to 1100 MPa.

In one example, the core material of the component body may be an aluminum alloy, wherein the core material has a tensile strength $R_{M,K}$ in a range of 300 MPa to 600 MPa and the deformation zone has a tensile strength $R_{M,D}$ in a range of 50 MPa to 200 MPa.

In one example, the tensile strength profile has a minimum tensile strength span, wherein absolute tensile strength values of the tensile strength profile vary by at least 5% and at most 30% with respect to a tensile strength average. This can for example realize a tensile strength variation of at least 10% and a maximum of 60%. With respect to the tensile strength of the core material, the tensile strength profile of the deformation zone may have tensile strength values reduced by at least 30% and up to 150%.

In one example, the tensile strength of the core material is always higher than a tensile strength in the deformation zone. Accordingly, a deformation of the component body may be limited to the deformation zone and/or to regions adjacent to the deformation zone. Correspondingly, the core material may experience less deformation than the deformation zone when a force is acting on the component body. In particular, a rigidity of the component body can be increased, and an advantageously increased deformation resistance of the component body can be achieved.

In one example, the component body extends along a longitudinal direction and the deformation zone is formed, in particular in the event of an impact, in order to obtain a longitudinally predetermined deformation profile, in particular a bend and/or a fold of the component body. With the reduced tensile strength of the deformation zone, a preferred direction of a folding and/or bending of the component body can be determined.

Furthermore, the component body may have a plurality of deformation zones, which each have a tensile strength profile. A temporal sequence of folds may be realized by increasing average values of the tensile strengths of the tensile strength profiles in the respective deformation zones. For example, deformation zones with a greater tensile strength than deformation zones with a low tensile strength can realize a folding of the component body in a temporally subordinate manner. Accordingly, deformation zones with lower tensile strength can give way first during impact.

In one example, the deformation zones may be distributed locally in the component body, wherein the core material has a higher tensile strength relative to the deformation zones. As a result, the advantage is achieved that the deformation zones do not reduce the stability of the component body, in particular in the case of static or, compared to an impact, a smaller dynamic load.

Furthermore, dimensionally stable regions between the deformation zones can be formed by a spaced arrangement of the deformation zones, which, in the event of an impact, do not deform or only slightly deform in comparison to the deformation zones. The combination of dimensionally stable regions and deformation zones can be used to control a defined deformation of the component body in the event of an impact in order to allow a high degree of energy reduction. For example, in the event of an impact, a concertina-like compression of the component body in the impact direction and/or the longitudinal direction can be realized reproducibly.

In one example, the component body with the deformation zone is integrally formed from the same sheet metal material, in particular from a metal or a metal alloy.

In one example, the deformation zone is partially oval, circular, triangular and/or rectangular in shape. Furthermore, the deformation zone may correspond to any free-form, which may be adapted to the geometry of the component body. In particular, the deformation zone can be arranged in planar regions of the component body. In particular, a surface circumference of the deformation zone can have a continuous curvature, so that the deformation zone can be edge-free.

In one example, the deformation zone includes a tensile strength gradient field that describes a change in tensile strength along a body surface in the deformation zone corresponding to a predetermined tensile strength topography, and wherein the tensile gradient field has a plurality of local maxima. In particular, the tensile strength gradient field describes the local rates of change of tensile strength in the deformation zone. In particular, the tensile strength topography is a scalar field which assigns a tensile strength amount to each point of the deformation zone in an arbitrarily fine grid. By arranging a plurality of maximum tensile strength maxima and/or tensile strength minima within the deformation zone, a multi-step deformation, in particular a formation of a plurality of bends or fold edges, can be realized with a force acting on the vehicle component.

In one example, the component body has a first end edge, and the deformation zone is at least partially arranged at the first end edge, wherein the deformation zone has at least a local tensile strength minimum at the first end edge, and wherein the tensile strength within the deformation zone increases with increasing distance from the first end edge.

In particular, the tensile strength within the deformation zone may increase continuously up to an edge region of the deformation zone with the surrounding core material. The edge region can be defined in particular by a surface circumference of the deformation zone on a body surface of the component body. Furthermore, this continuous increase in tensile strength can be interrupted by local tensile strength maxima, with a tensile strength maximum forming a localized region of increased tensile strength in the deformation zone.

The deformation zone may, for example, have a reduced tensile strength in the longitudinal direction at a component body end of the component body and/or regions of the deformation zone that are further away from the component body end may have an increased tensile strength. Correspondingly, upon a force acting on the component body, at first a deformation at the component body end and subsequently a deformation away from the component body end can be realized temporally and/or locally.

A maximum tensile strength within the deformation zone, in particular in the form of a maximum tensile strength, may correspond to a tensile strength outside the deformation zone in the core material. This maximum tensile strength is surrounded in the deformation zone by regions of lower tensile strength, wherein the tensile strength at the edge region may increase in order to achieve an adjustment of the tensile strength of the edge region of the deformation zone to a tensile strength of the core material.

In one example, the component body has a second end edge, which is arranged at an angle to the first end edge, wherein the deformation zone is at least partially arranged on the second end edge. The deformation zone can be arranged, for example, in a corner geometry of the component carrier.

In one example, the component body has a body surface and a sheet thickness, which describes the material thickness of the component body in the direction of a surface normal axis of the body surface, wherein the deformation zone completely penetrates the component body with respect to the sheet thickness and has an edge region which follows a circumference of the deformation zone on the body surface, and wherein the tensile strength in the edge region adjusts to the tensile strength of the material of the component body, which surrounds the deformation zone, to form a homogeneous tensile strength transition.

In one example, the tensile strength of the deformation zone continuously decreases toward a center of the deformation zone.

In one example, the tensile strength changes along a surface cross-section to the center of the deformation zone of the deformation zone along different, in particular opposite, directions changes with different speeds.

In one example, the deformation zone has a first tensile strength profile and a second tensile strength profile, each extending along a straight surface section including a center of the deformation zone, the tensile strength profiles each describing a change in tensile strength from an edge point of the deformation zone to the center of the deformation zone, and wherein the first tensile strength profile with respect to the second tensile strength profile has a smaller maximum tensile strength change rate.

In the component body a plurality of tensile strength profiled deformation zones, which are distributed locally and spaced from each other in the component body may be formed. Each of the deformation zones may have a variable tensile strength according to a predetermined tensile strength profile. The tensile strength profiles may be continuously connected with one another and form a local or global tensile strength extremity at a point of connection between the two tensile strength profiles.

In one example, the vehicle component comprises a coupling element, which is arranged on the component body and outside the deformation zone, in particular between two adjacent deformation zones. In particular, the vehicle component may be a longitudinal beam, wherein the coupling element is an externally coupled transverse strut. The externally coupled transverse strut can be aligned at an angle, in particular in an angular range of 30 to 90 degrees, in particular 45 to 90 degrees, to the component body.

Furthermore, the coupling element can be an inner reinforcement plate or patch, which is arranged outside the deformation zone. The coupling element can be connectable to other vehicle components in order to integrate the vehicle component in a vehicle body. A connection between the vehicle component and the vehicle body via the coupling element may be formed in particular in a region of the component body which has an increased tensile strength in order, when a force is acting on the coupling element, to concentrate a deformation of the component body on the deformation zone, in particular limiting on the deformation zone.

In one example, the coupling element is arranged at least partially in the deformation zone. In particular, the coupling element can form a common load path with the component body, wherein the deformation zone is formed directly in a joint connection of the coupling element with the component body.

In one example, a connection between the component body and the coupling element is reinforced by means of an additional reinforcing element, in particular a transversely inserted partition plate, in order to increase a strength of a connection of the coupling element to the component body.

In one example, the component body has a force receiving region on which, in particular in the case of an impact of the vehicle, the force acting on the vehicle component is maximum, wherein the deformation zone is arranged in the force receiving region. As a result, the advantage is achieved that a deformation of the component body can be realized directly at the force introduction point. A deformation of the component body distanced from the force introduction point and/or distanced from the deformation zone can be correspondingly reduced or prevented. The structural integrity and/or the shape of the component body can be obtained, in particular distanced from the force introduction point.

In one example, the component body has a force-receiving region, wherein a deformation zone arranged downstream of the force-receiving region has an tensile strength which is increasing in respect to an increasing distance from the force-receiving region. In particular, by a deformation of a region of the deformation zone with low tensile strength, the tensile strength in this region, in particular in the direction of force introduction, increase until the tensile strength exceeds regions of the deformation zone with higher tensile strength. In the following, these regions with higher tensile strength deform. Accordingly, a temporally cascaded deformation of the component body can be realized by means of a deformation zone with a variable tensile strength profile.

In one example, the deformation zone has a plurality of local tensile strength maxima, and wherein the amounts of the local tensile strength maxima increase with increasing distance from the force receiving region.

In one example, the deformation zone has a plurality of local tensile strength maxima along a longitudinal axis of the vehicle, wherein the amounts of the local tensile strength maxima increase from a respective vehicle end to a vehicle center, in order to, in the event of an impact of the vehicle, produce a series of localized tensile strength maxima with a tensile strength increasing in the direction of action of force at the front or rear region.

In one example, the deformation zone has a plurality of local tensile strength maxima along a transverse axis of the vehicle, wherein the amounts of the local tensile strength maxima increase from a respective vehicle side toward a vehicle center, in order, upon impact of the vehicle, to include a series of local tensile strengths maxima in the side region, which comprise a tensile strength increasing in the direction of the acting force. The transverse direction of the vehicle may in particular run transversely to a direction of travel and/or transversely to a vertical axis of the vehicle. In particular, the component body may be a cross beam, which is aligned along the transverse direction from one side of the vehicle to another side of the vehicle.

The vehicle component may be integrated into a vehicle body in such a way that a force is introduced into the component body at a region of low tensile strength of the deformation zone. Alternatively, the component body may be connected to the vehicle body with a high tensile strength attachment portion, and the deformation zone is spaced from the attachment portion to realize deformation of the component body distanced from the attachment portion. A deformation of the component body can in particular have the advantage of a reduced impulse transmission to a vehicle occupant of the vehicle. Furthermore, uncontrolled shifting and/or deformation of the component carrier, in particular into the passenger compartment of the vehicle, can be prevented.

Furthermore, a pulse change rate of the vehicle in the event of an impact can be advantageously reduced since, in the event of an impact on a, in particular immovable, obstacle, the vehicle is decelerated during the deformation of the component body. Further, during an impact of another vehicle to the rear, an acceleration of the vehicle can be advantageously reduced, since initially the component body is deformed and absorbs a portion of the impact energy. As a result, acceleration forces, in particular acting on vehicle occupants, can advantageously be reduced. In particular, the deformation zone may have a tensile strength profile that has a tensile strength gradient that maximizes energy absorption of the component carrier in an impact and/or maintains structural integrity of the component carrier up to a maximum impulse and/or maximum kinetic energy. Accordingly, the tensile strength profile may have a waveform, a linearly rising shape, or a superposition of the aforementioned shapes.

In one example, the vehicle component is arranged along a vertical axis in a vehicle and the deformation zone has a plurality of local tensile strength maxima transversely to the direction of travel of the vehicle, and wherein the amounts of the local maximum tensile strength increase, in particular with a vehicle height.

In one example, the vehicle component, in particular a roof cross beam, floor cross beam and/or floor panel along a transverse axis, which is in particular parallel to a roadway and perpendicular to a direction of travel, is arranged in a vehicle and the deformation zone has a plurality of local tensile strength maxima transversely to the direction of travel of the vehicle.

The amounts of the local tensile strength increase maxima increase, in particular in the direction towards a vehicle center and/or with distance from a side impact surface of the vehicle. Furthermore, the amounts of local tensile strength maxima may increase with increasing distance from a force introduction point. The force introduction point may in particular be arranged on an outer surface of the vehicle body.

In one example, the component body is formed in a longitudinal direction and the deformation zone has a cross-sectional length in the longitudinal direction, which corresponds to at least 0.2 times a component body length in the longitudinal direction.

In one example, the component body has a body surface, and a region of the deformation zone on the body surface is at least 0.05 to 0.4 times an area of the body surface.

In one example, the tensile strengths of the spatially distributed deformation zones are lower relative to the surrounding core material of the component body.

In one example, the component body additionally has further locally distributed deformation zones transversely to the longitudinal direction. In particular, the deformation zones arranged transversely to the longitudinal direction may have the same characteristics as the deformation zones arranged in the longitudinal direction.

In one example, the vehicle component is a vehicle pillar, in particular an A-, B-, or C-pillar, a carrier, in particular a longitudinal beam or a cross beam, a bumper, or a body component.

In one example, the different tensile strengths within the deformation zone are caused by different material hardnesses. A change in material hardness can be realized by heat, mechanical deformation, chemical processes and/or structural changes, such as material recesses. The tensile strength can be proportional to the material hardness of the respective region in the deformation zone. In one example, the component body is produced by thermoforming, also known as press hardening.

In particular, the deformation zone can be softened by means of a heat treatment of an already hardened component body. The component body can be formed from a combination of materials comprising martensite, residual austenite, perlite, ferrite and/or bainite. The material hardness of the component body may be dependent on a martensite percentage. The deformation zone can be produced by a partial austenitization of the component body, in particular with subsequent ferrite-pearlite conversion. A softening of the deformation zone achieves the advantage of better formability. Alternatively, tempering may be performed at a temperature less than a recrystallization temperature Ac3.

Furthermore, the softening of the deformation zone can be realized by recrystallization of the component body, which is formed in particular by a thin sheet metal. The grain structure of the material can be completely renewed by brief heating to allow further cold forming.

In one example, the component body is formed from a cold hardened 5000 aluminum alloy, and after a deformation of the component body, the component body can be heat treated by induction, laser, burner and/or heating plate in a partial region to produce the deformation zone and in particular the tensile strength profile. A subsequent heat treatment of the surrounding high-strength regions can be omitted. Furthermore, the surrounding high-strength regions can be additionally cooled in order to lower a heat flow. Accordingly, a heat input can be restricted to a limited range. This may be necessary for regions of the deformation zone with low tensile strength, since they can experience an increased heat input.

In one example, the component body is formed from a work hardened 5000 or a precipitation hardenable 6000 or 7000 aluminum alloy, and prior to reshaping the component body, the component body may be heat treated by induction, laser, burner and/or heating plate in a portion to create the deformation zones. The heat treatment can be varied in duration and/or intensity, wherein a change in the tensile strength can be proportional to an energy input into the deformation zone or a local region of the deformation zone.

After the heat treatment, a cooling of the deformation zones and/or the semi-finished product can be realized by means of an active cooling, in particular the semi-finished product can be quenched. Subsequently, the semi-finished product can be formed to the component body by means of a cold pressing tool. Forming may take place immediately after the heat treatment and/or after cooling. For a 5000 alloy, reshaping may be necessary immediately after the heat treatment.

In one example, the vehicle component is a longitudinal beam or a fender in a front end and/or a rear portion of a vehicle, wherein the deformation zone is formed, during an impact, to controllably compress and/or bend the vehicle component.

In one example, the vehicle component is a deformation element in the front and/or the rear portion of the vehicle, wherein the deformation element is arranged in a main load path, in an upper load path and/or a lower load path of the vehicle, and wherein the deformation zone in an impact is formed to control and/or to bend the deformation element in a controlled manner.

In one example, the vehicle component is a beam in the front and/or rear of the vehicle, wherein the deformation zones in an impact are formed to controllably twist and/or bend the beam.

In one example, the vehicle component is a diagonal strut in the front of the vehicle, wherein the deformation zones overlap during impact are formed in a low impact to bend the diagonal strut in a controlled manner.

In one example, the vehicle component is a vertical strut in the front of the vehicle, wherein the deformation zone in an impact is formed to bend the vertical strut in a controlled manner.

In one example, the vehicle component is an end wall in the front of the vehicle, wherein the deformation zone in an impact is formed to compress the end wall in a controlled manner.

In one example, the vehicle component is a tunnel, a seat cross beam, a longitudinally arranged undercarriage and/or a heel plate, which are respectively arranged in an underbody of the vehicle, wherein the deformation zone is formed in an impact, to compress the vehicle component in a controlled manner.

In one example, the vehicle component is arranged laterally left or right or on the roof of the vehicle, the vehicle component forms an A-pillar, a B-pillar, a C-pillar, a roof cross beam and/or a roof frame, and wherein the deformation zone at an impact is formed to bend the vehicle component in a controlled manner and/or to provide expansion reserves of stiffness jumps.

In one example, the vehicle component is arranged laterally on the left or on the right, in particular in a door of the vehicle, wherein the vehicle component is a door impact carrier and the deformation zone is formed in an impact to bend the door impact carrier in a controlled manner. The controlled bending of the door impact carrier can be realized in particular while maintaining the structural integrity of the door impact carrier and a reduction, in particular a minimization, of a maximum penetration depth of the door impact beam.

In one example, the vehicle component is arranged in the interior of the vehicle, in particular as part of a vehicle seat, wherein the vehicle component is a backrest, a flank and/or a seat surface, and wherein the deformation zone is formed in a collision, to compress and to bend the vehicle component in a controlled manner to prevent an uncontrolled collapse of the vehicle component.

With a controlled bending of the vehicle component, the deformation zone can have a low tensile strength at force introduction points and an increased tensile strength away from force introduction points. In a controlled bending, an concertina-like folding of the vehicle component can be realized by an alternating arrangement of regions of lower tensile strength and regions with greater tensile strength.

In one example, the deformation zone forms a predetermined bending point in order to prevent bending of regions of the vehicle component which are vulnerable to bending outside the deformation zone.

A controlled deformation can be defined as a predetermined geometric influence, in particular with a predetermined deformation direction and/or a predetermined temporal sequence. A controlled compression, kinking, bending, twisting and/or folding achieves the advantage that an uncontrollable collapse of the vehicle component can be prevented.

In one example, the component body with the deformation zone is formed from the core material in one piece, in particular in one piece and without interruption. As a result, the advantage is achieved that the component body can have gap-free transitions between the deformation zones and the core material and/or a connection of the deformation zone to the component body by adhesive, welding or screw connections can be dispensed. Furthermore, the component body may have a homogeneous surface and/or a homogeneous surface structure. Furthermore, this can realize the advantage of efficient power transmission from the core material to the deformation zone.

BRIEF DESCRIPTION OF THE DRAWINGS

Further examples will be explained with reference to the accompanying figures.

FIG. 1A shows a vehicle component in one example;
FIG. 1B shows a vehicle component in one example;
FIG. 3A shows a vehicle component in one example;
FIG. 3B shows a vehicle component in one example.

DETAILED DESCRIPTION

Figure 2B:
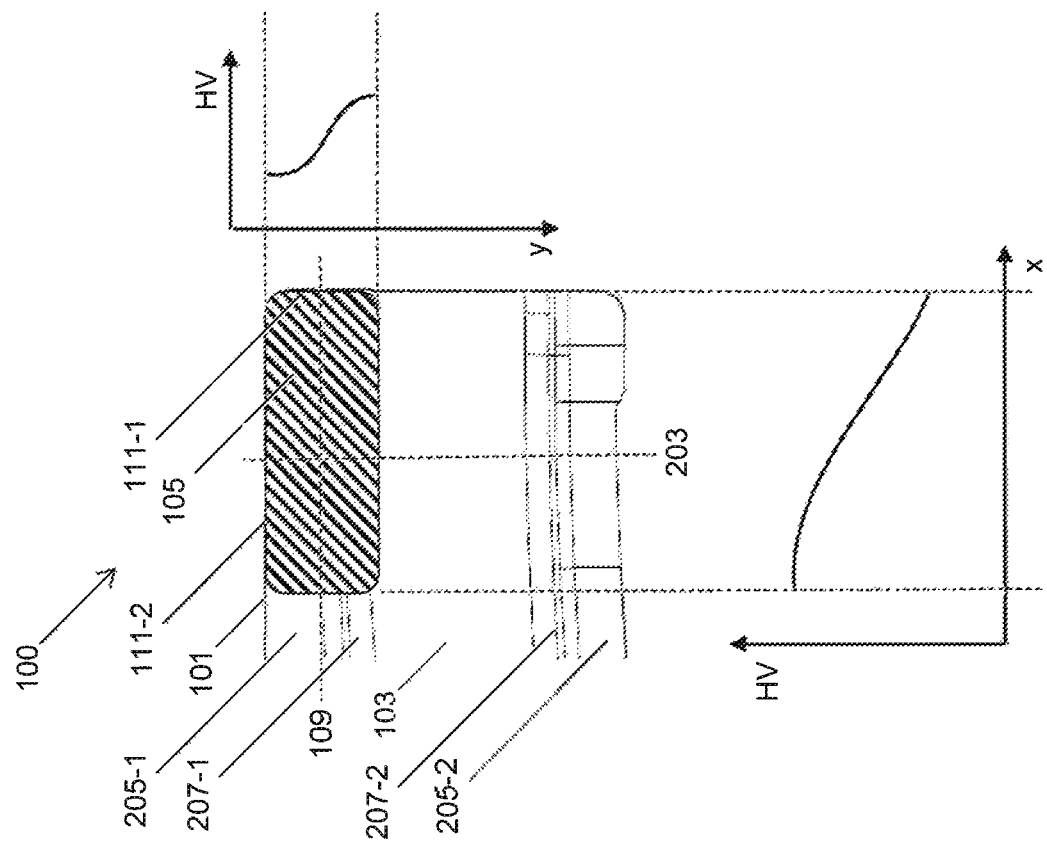
FIG. 2B shows a vehicle component in one example.

FIG. 1A shows a schematic illustration of a vehicle component 100 for a vehicle in one example, with a component body 101, which is formed from a core material 103. The component body 101 has a localized deformation zone 105, which is arranged flat in the core material 103. The deformation zone 105 has a locally variable tensile strength according to a predetermined tensile strength profile in order to influence a deformation profile of the component body 101 when a force is applied to the component body 101.

Furthermore, the deformation zone 105 has a first tensile strength profile 113-1 and a second tensile strength profile 113-2, which respectively extend along a straight surface cross-section 115 comprising a center 117 of the deformation zone 105. The tensile strength profiles 113-1, 113-2 each describe a change in tensile strength from a respective edge point 119-1, 119-2 of the deformation zone 105 to the center 117 of the deformation zone 105.

Further, the first tensile strength profile 113-1 has a smaller maximum tensile strength change rate with respect to the second tensile strength profile 113-2. The surface cross section 115 runs parallel to the longitudinal direction 109, wherein the component body 101 is formed along the longitudinal direction 109. For the region between the boundary points 119-1, 119-2, the material hardness is shown in diagram form, wherein the material hardness is described in a relative indication of the Vickers hardness (HV) over a spatial direction (X-axis). The material hardness is indicated along the surface cross section 115.

FIG. 1B shows a further schematic illustration of a vehicle component 100 for a vehicle in one example, with a component body 101, which is formed from a core material 103. The component body 101 has a localized deformation zone 105, which is arranged flat in the core material 103. The deformation zone 105 has a locally variable tensile strength according to a predetermined tensile strength profile in order to influence a deformation profile of the component body 101 when a force is applied to the component body 101. The deformation zone 105 is rectangular in shape and extends with a first end edge 111-1 to the edge of the component body 101.

At least two tensile plateaus 107-1, 107-2 are formed in the deformation zone 105, which have different tensile strengths in respect to each other and in respect to the core material 103. Further, the deformation zone 105 has a tensile strength gradient field describing a change in tensile strength along a surface of the deformation zone 105 according to a predetermined tensile strength topography. Furthermore, the tensile strength topography has a plurality of local maxima.

For the region between the first end edge 111-1 and the edge point 119-1, the material hardness of the deformation zone 105 is depicted in diagram form, the material hardness being described in a relative indication of the Vickers hardness (HV) over a spatial direction (X-axis). The material hardness is indicated along the indicated longitudinal direction 109.

In one example, the component body 101 may be aligned in the direction of travel 111 of the vehicle. Furthermore, the material hardness of the deformation zone 105 may have a wave-like profile shape in order to cause an concertina-like folding of the component body 101 and/or a force absorption at introduction points in the event of an impact.

Figure 2A:
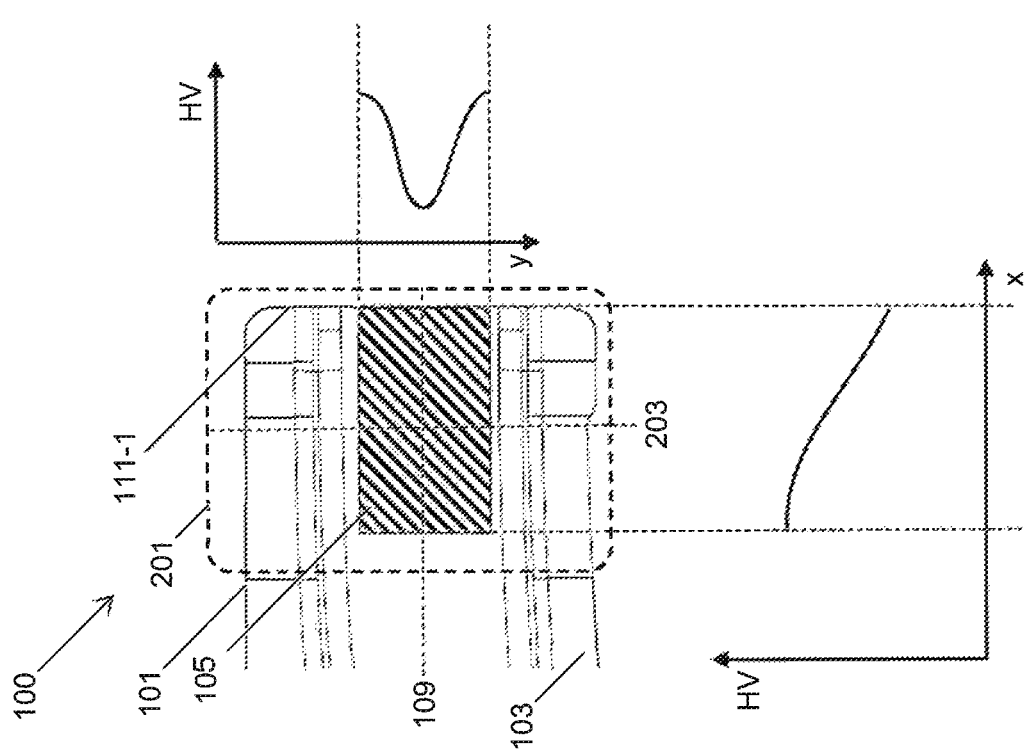
FIG. 2A shows a vehicle component in one example.

FIG. 2A shows a schematic illustration of a vehicle component 100 for a vehicle in one example, with a component body 101 which is formed from a core material 103. The component body 101 has a localized deformation zone 105, which is arranged flat in the core material 103.

The component body 101 further has a first end edge 111-1 and the deformation zone 105 is at least partially arranged on the first end edge 111-1. Furthermore, the deformation zone 105 has at least one local tensile minimum at the first end edge 111-1 and the tensile strength increases within the deformation zone 105 with increasing distance from the first end edge 111-1.

The component body 101 also has a force receiving region 201, on which in the event of a collision of the vehicle, the force on the vehicle component 100 is maximum. The deformation zone 105 is arranged in the force receiving region 201.

The material hardness of the deformation zone 105 is shown diagrammatically along the longitudinal direction 109 (X axis) and along a transverse direction 203 (Y axis). The material hardness is described in a relative indication of the Vickers hardness (HV) in respect to one spatial direction, respectively, here marked by the X-axis or Y-axis. In the X direction, the deformation zone 105 has a continuously decreasing tensile strength profile and in the Y direction the deformation zone 105 has a lower tensile strength profile, which in particular is symmetrical. Further, the tensile strength profile in the Y direction is scaled according to the tensile strength profile in the X direction. In particular, the tensile strength minimum, which is plotted on the Y-axis, has a decreasing tensile strength in the direction of the X-axis.

FIG. 2B shows a schematic illustration of a vehicle component 100 for a vehicle in one example, with a component body 101, which is formed from a core material 103. The component body 101 has a localized deformation zone 105, which is arranged flat in the core material 103.

The component body 101 has a second end edge 111-2, which is arranged at an angle to the first end edge 111-1, and wherein the deformation zone 105 is at least partially arranged on the second end edge 111-2. In particular, the second end edge 111-2 is arranged at right angles to the first end edge 111-1. Furthermore, the deformation zone 105 is arranged in an edge region, in particular in a corner of the component body 101.

The material hardness of the deformation zone 105 is shown diagrammatically along the longitudinal direction 109 (X axis) and along a transverse direction 203 (Y axis). The material hardness is described in a relative indication of the Vickers hardness (HV) in respect to a one spatial direction, respectively, here marked by the X-axis or Y-axis. In the X direction, the deformation zone 105 has a continuously decreasing tensile strength profile and in the Y direction the deformation zone 105 has a wave-shaped tensile strength profile, which is particularly asymmetrical. Further, the tensile strength profile in the Y direction is scaled according to the tensile strength profile in the X direction. In particular, tensile strength profile at the Y-axis has an increasing tensile strength span with increasing tensile strength maximum and falling tensile strength minimum in the X-axis direction.

The component body 101 is formed with an U-shaped profile and further comprises two flattened sidebands 205-1, 205-2 and two curved portions 207-1, 207-2, which are formed in the longitudinal direction 109, wherein the flattened sidebands 205-1, 205 each are adjacent to a curvature region 207-1, 207-2. The deformation zone 105 extends beyond a plateau region of the U-profile shape into the curvature region 207-1. Accordingly, the deformation zone 105 may also have a curved profile shape.

FIG. 3A shows a schematic representation of a vehicle component 100 for a vehicle in one example, with a component body 101, which is formed from a core material 103. The component body 101 has a plurality of localized deformation zones 301-1, 301-2, 301-3, 301-4, which are arranged flat in the core material 103. Further, the component body 101 is elongated along the longitudinal direction 109.

The deformation zones 301-1, 301-2, 301-3, 301-4 are each distributed locally and spaced apart in the component body 101, wherein each of the deformation zones 301-1, 301-2, 301-3, 301-4 having a locally variable tensile strength according to a given respective tensile strength profile. The tensile strength profile of the deformation zone 301-4 may correspond to the tensile strength profile of the deformation zone 301-3.

The respective tensile strength profile of the deformation zones 301-1, 301-2, 301-3 is shown diagrammatically along the respective surface cross sections 307-1, 307-2, 307-3. The material hardness is described in a relative indication of the Vickers hardness (HV) over one spatial direction, here indicated by the X-axis. In the X direction, the deformation zone 301-1 has a wave-shaped, continuously increasing tensile strength profile, and the deformation zones 301-2, 301-3 each have a wave-shaped decreasing tensile strength profile. In the deformation zones 301-2, 301-3, a plurality of tensile strength maxima are formed, respectively.

Furthermore, the locally distributed deformation zones 301-1 to 301-4 are formed in order, in the event of an impact, to obtain a predetermined deformation course of the component body 101 in the longitudinal direction 109, in particular a bend or a fold. The locally distributed deformation zones 301-1 to 301-4 are spaced from each other at a predetermined distance and are insulated by core material 103. The core material 103 has a greater tensile strength than the deformation zones 301-1 to 301-4.

The vehicle component 100 has an U-profile shape, wherein at the profile ends in each case a flattened sideband 305-1, 305-2 is formed, on which the further deformation zones 301-3 and 301-4 are arranged. The further deformation zones 301-3; 301-4 may have an average lower tensile strength with respect to the deformation zones 301-1, 301-2.

FIG. 3B shows a schematic representation of a vehicle component 100 for a vehicle in one example, with a component body 101, which is formed from a core material 103. The component body 101 has a plurality of localized deformation zones 301-1 to 301-5, which are arranged flat in the core material 103.

Furthermore, the vehicle component 100 comprises a coupling element 303, which is arranged on the component body 101 and outside the deformation zone 301-2, in particular between two adjacent deformation zones 301-2, 301-4. A connection between the component body 101 and the coupling element 303 can be reinforced by means of an additional reinforcing element, in particular by a transversely inserted partition plate, in order to increase a strength of a connection of the coupling element 303 to the component body 101.

The component body 101 has a force receiving region 201 on which the force acting on the vehicle component 100 is maximum in the event of a collision of the vehicle. The deformation zone 301-1 is arranged in the force receiving region 201, and a deformation zone 301-2 arranged downstream of the force receiving region 201 has an increasing tensile strength with increasing distance from the force receiving region 201.

Figure 4:
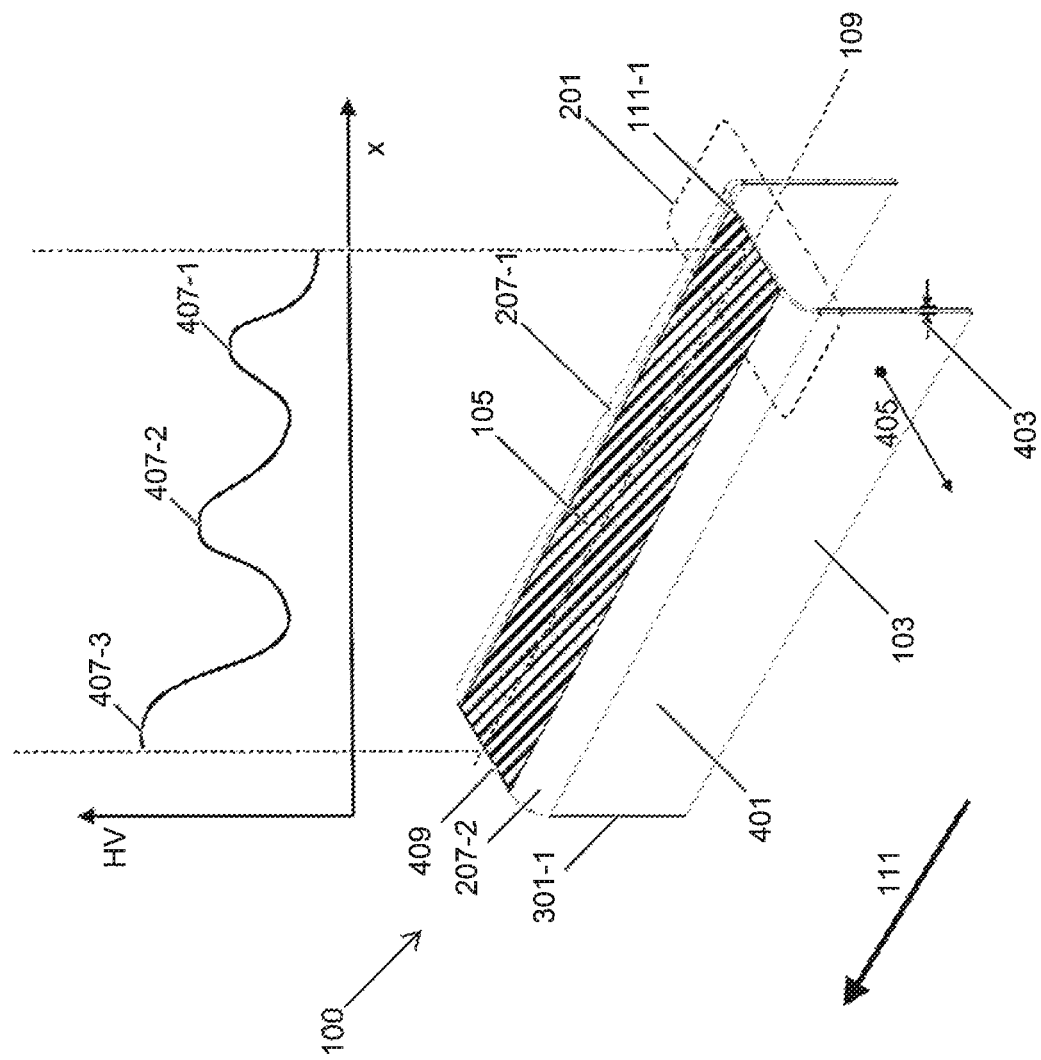
FIG. 4 shows a vehicle component in one example.

FIG. 4 shows a schematic representation of a vehicle component 100 for a vehicle in an example, with a component body 101, which is formed from a core material 103. The component body 101 has a localized deformation zone 105, which is arranged flat in the core material 103. Further, the component body 101 is elongated along the longitudinal direction 109 and is formed with an U-shaped profile. Adjacent to the deformation zone, a curvature region 207-1, 207-2 is formed laterally in each case.

The component body 101 further has a body surface 401 and a sheet thickness 403, which describes the material thickness of the component body 101 in the direction of a surface normal axis 405 of the body surface 401, and wherein the deformation zone 105, completely penetrates the component body 101 with respect to the sheet thickness 403 and has an edge region, which follows a circumference of the deformation zone 105 on the body surface 401, and wherein the tensile strength in the edge region adjusts to the tensile strength of the material surrounding the deformation zone 105 of the component body 101, to form a homogeneous tensile strength transition.

The component body 101 has a force receiving region 201, at which, a force on the vehicle component 100 in the event of a collision of the vehicle is maximum. The deformation zone 105 is at least partially arranged in the force receiving region 201.

The deformation zone 105 has a plurality of local tensile strength maxima 407-1, 407-2, 407-3, wherein the amounts of the local tensile strength maxima increase with increasing distance from the force receiving region 201. Furthermore, the deformation zone 105 is arranged flat in the core material 103 and has a locally variable tensile strength according to a predetermined tensile strength profile in order to influence a deformation profile of the component body 101 when a force is applied to the component body 101. The deformation zone 105 has a rectangular shape and extends with a first end edge 111-1 as far as a first edge of the component body 101 and with a further end edge 409 as far as a second edge of the component body 101.

For the region between the first end edge 111-1 and the further end edge 409, the material hardness of the deformation zone 105 is shown in diagram form, wherein the material hardness is described in a relative indication of the Vickers hardness (HV) in respect to a spatial direction (X-axis). The material hardness is indicated along the indicated longitudinal direction 109.

Figure 5:
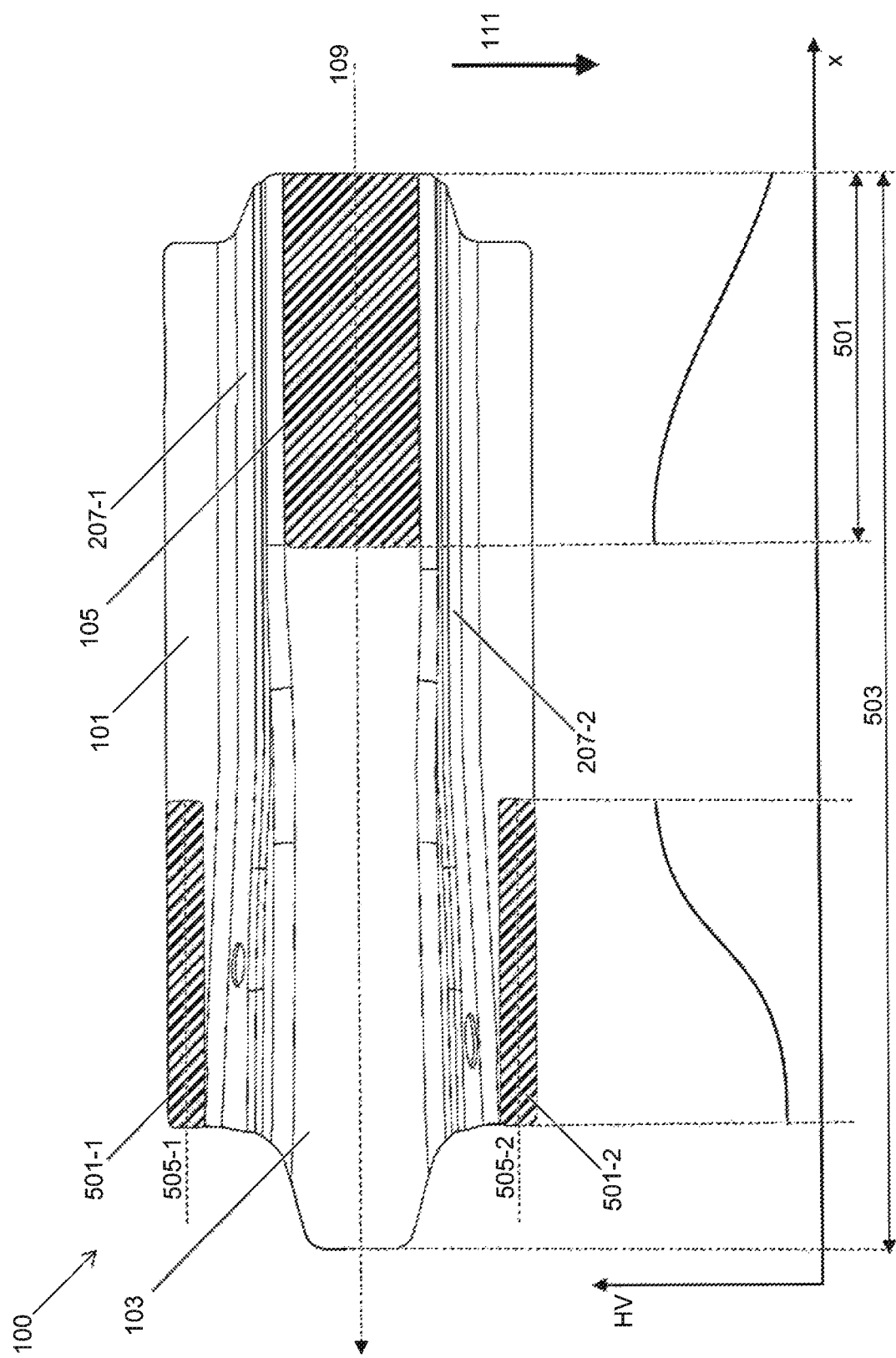
FIG. 5 shows a vehicle component in one example.

FIG. 5 shows a schematic illustration of a vehicle component 100 for a vehicle in one example, with a component body 101, which is formed from a core material 103. The component body 101 has a localized deformation zone 105, which is arranged flat in the core material 103. Further, the component body 101 is elongated along the longitudinal direction 109 and in an U-shaped profile, wherein the component body 101 has two curved regions 207-1, 207-2, which extend in the longitudinal direction. The curved regions 207-1, 207-2 are formed to form the U-profile shape of the component body 100. A side band 305-1, 305-2 is laterally connected to the curved regions 207-1, 207-2, respectively. On the sideband 305-1, the deformation zone 501-1 is arranged and on the sideband 305-2, the deformation zone 501-2 is arranged.

The component body 101 extends along a longitudinal direction 109 and the deformation zone 105 is formed in order, in the event of an impact, to obtain a predetermined deformation course in the longitudinal direction 109 of the component body 101, in particular a bend or a fold. The vehicle component 100 is a seat cross beam, which can be arranged in an underbody of a vehicle.

The component body 101 is formed integrally and without interruption from the core material with the deformation zones 105, 501-1, 501-2. Further, each of the spatially distributed deformation zones 105, 501-1, 501-2 each has a tensile strength profile different from a tensile strength of the component body 101 outside the respective deformation zone 105, 501-1, 501-2. The tensile strength outside the deformation zones 105, 501-1, 501-2 is in particular greater than or at least equal to a respective maximum tensile strength within the deformation zones 105, 501-1, 501-2.

The deformation zone 105 has a cross-sectional length 501 in the longitudinal direction 109, which corresponds to at least 0.2 times a component body length 503 in the longitudinal direction 109. Further, the component body 101 has a body surface 401, and an area of the deformation zone 105 on the body surface 401 is at least 0.05 to 0.4 times an area of the body surface 401.

The respective tensile strength profile of the deformation zones 105, 501-2, 501-3 is shown diagrammatically along the longitudinal direction 109 or along the respective surface cross sections 505-1, 505-2. The material hardness is described in a relative indication of the Vickers hardness (HV) in respect to a spatial direction, here indicated by the X-axis. In the X direction, the deformation zone 105 has a wave-like, continuously increasing tensile strength profile, and the deformation zones 501-1, 501-2 each have a wave-shaped decreasing tensile strength profile.

Figure 6:
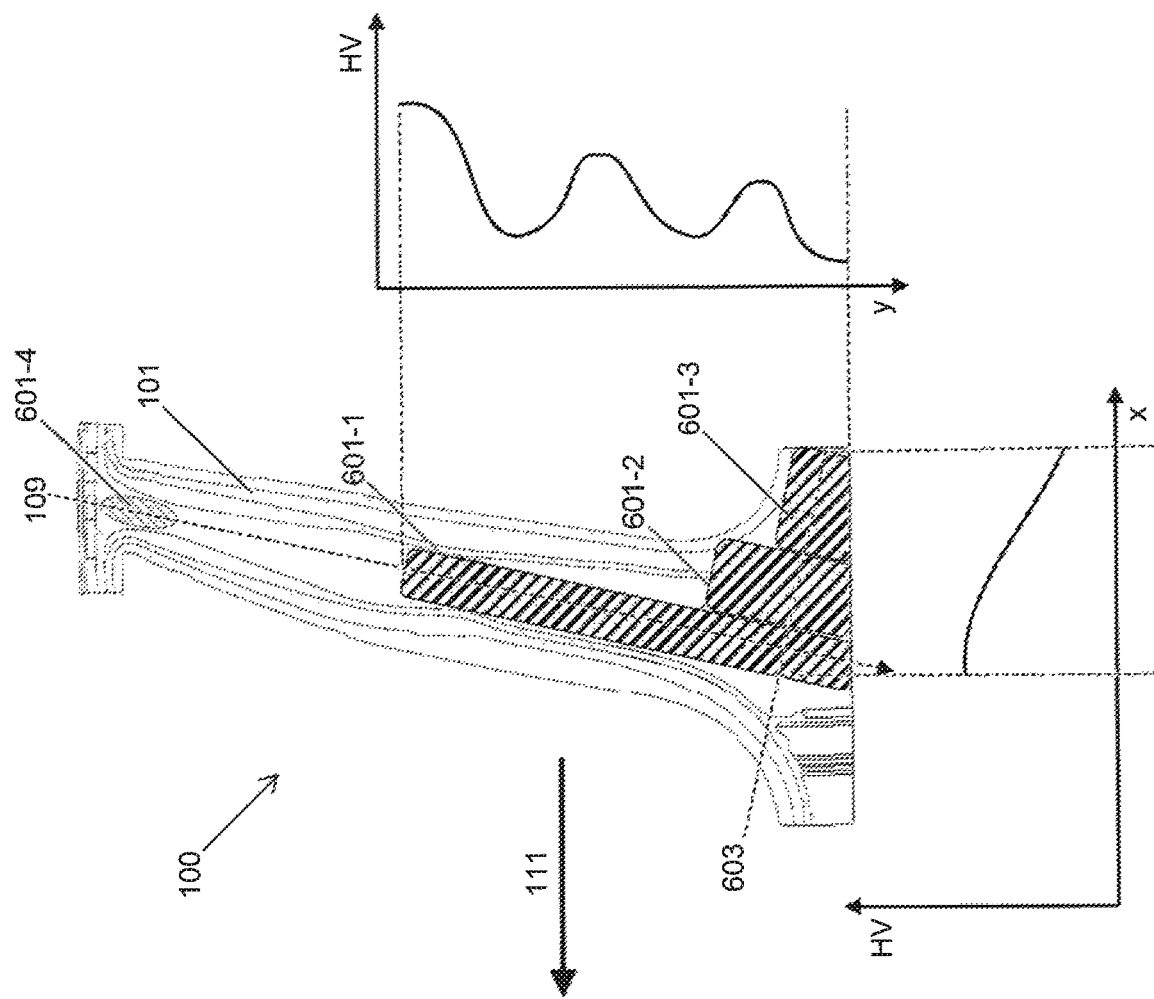
FIG. 6 shows a vehicle component in one example.

FIG. 6 shows a schematic representation of a vehicle component 100 having a component body 101, which extends in a longitudinal direction 109 in an elongated manner. The component body 101 has transversely to the longitudinal direction 109 locally distributed deformation zones 601-1, 601-2, 601-3, 601-4, which are formed in the component body 101 of sheet material. The vehicle component 100 is a B-pillar, which can be arranged laterally and/or on a roof of a vehicle.

The vehicle component 100 in a region of the deformation zones 601-1 to 601-3 may be connected to a vehicle floor and/or in the region of the deformation zone 601-4 to a vehicle roof.

The vehicle component 100 is arranged along a vertical axis in a vehicle, and the deformation zone 601-1 has a plurality of local tensile strength maxima transversely to the direction of travel of the vehicle, wherein the amounts of the local maximum tensile strength, increase in particular with a vehicle height.

The material hardness of the deformation zone 601-1 is shown diagrammatically along the longitudinal direction 109 (Y axis). Further, the material hardness of the deformation zones 601-1, 601-2, 601-3 is plotted along a surface cross section 603 (Y axis) in diagram form. The material hardness is described in a relative indication of the Vickers hardness (HV) in respect to one spatial direction, here marked by the X-axis or Y-axis. In the X direction, the deformation zones 601-1, 601-2, 601-3 have a continuously decreasing tensile strength profile, and in the Y-direction, the deformation zone 601-1 has a wave-shaped falling tensile strength profile having a plurality of tensile strength maxima.

LIST OF REFERENCE NUMBERS 100 vehicle component
101 component body
103 core material
105 deformation zone
107-1 tensile strength plateau
107-2 tensile strength plateau
109 longitudinally
111-1 terminal edge
111-2 terminal edge
113-1 tensile strength profile
113-2 tensile strength profile
115 surface cross-section
117 center
119-1 edge point
119-2 edge point
201 force introducing region
203 transversely
205-1 sideband
205-2 sideband
207-1 curved region
207-2 curved region
301-1 deformation zone
301-2 deformation zone
301-3 deformation zone
301-4 deformation zone
305-1 sideband
305-2 sideband
307-1 surface cross-section
307-2 surface cross-section
307-3 surface cross-section
401 body surface
403 sheet thickness
405 surface normal axis
407-1 tensile strength maxima
407-2 tensile strength maxima
407-3 tensile strength maxima
409 terminal edge
501-1 deformation zone
501-2 deformation zone
503 component body length
505-1 surface cross-section
505-2 surface cross-section
601-1 deformation zone
601-2 deformation zone
601-3 deformation zone
601-4 deformation zone
603 surface cross-section

What is claimed is:

1. A vehicle component for a vehicle, comprising:
a component body formed from a core material, wherein the component body has a localized deformation zone arranged flat in the core material, wherein the localized deformation zone has a locally variable tensile strength according to a tensile strength profile configured to influence a deformation profile of the component body upon a force acting on the component body,
wherein the component body has a body surface and a sheet thickness corresponding to a material thickness of the component body in a direction of a surface normal axis of the body surface, and wherein the localized deformation zone completely penetrates the component body with respect to the sheet thickness and has an edge portion following a circumference of the localized deformation zone on the body surface, and wherein a tensile strength of the localized deformation zone in the edge region equalizes to a tensile strength of a material of the component body surrounding the localized deformation zone to form a homogeneous tensile strength transition.

2. The vehicle component according to claim 1, wherein at least two tensile strength plateaus are formed within the localized deformation zone, wherein the at least two tensile strength plateaus have different tensile strengths with respect to each other and with respect to the core material.

3. The vehicle component according to claim 1, wherein the component body extends along a longitudinal direction, and wherein the localized deformation zone is configured to, in the event of an impact, obtain a deformation course of the component body in a longitudinal direction.

4. The vehicle component of claim 1, wherein the localized deformation zone has a tensile strength gradient field corresponding to a change in tensile strength along the body surface in the localized deformation zone according to a predetermined tensile strength topography, and wherein the tensile strength gradient field comprises a plurality of localized maxima.

5. The vehicle component according to claim 1, wherein the component body has a first end edge and the localized deformation zone is at least partially arranged on the first end edge, and wherein the localized deformation zone at the first end edge has at least a local tensile strength minimum, and wherein the tensile strength of the localized deformation zone increases with an increasing distance from the first end edge.

6. The vehicle component according to claim 5, wherein the component body has a second end edge arranged at an angle to the first end edge, and wherein the localized deformation zone is arranged at least partially at the second end edge.

7. The vehicle component according to claim wherein the tensile strength of the localized deformation zone decreases continuously in a direction of a center of the localized deformation zone.

8. The vehicle component according to claim 1, further comprising a plurality of deformation zones distributed locally and spaced apart from each other in the component body, wherein at least one of the plurality of deformation zones has a locally variable tensile strength according to a predetermined tensile strength profile.

9. The vehicle component according to claim 1, further comprising a coupling element arranged on the component body and outside of the localized deformation zone.

10. The vehicle component according to claim 1, wherein the component body has a force receiving region, and wherein the localized deformation zone is positioned downstream of the force receiving region, and wherein the tensile strength of the localized deformation zone is increased as a distance from the force receiving region is increased.

11. The vehicle component according to claim 10, wherein the localized deformation zone has a plurality of local tensile strength maxima, and wherein an amount of the plurality of local tensile strength maxima increases within the localized deformation zone with an increasing distance from the force receiving region.

12. The vehicle component according to claim 1, wherein the localized deformation zone has a plurality of local tensile strength maxima along a longitudinal axis of the vehicle, and wherein an amount of the plurality of local tensile strength maxima increases within the localized deformation zone from a respective vehicle end to a vehicle center, such that, during an impact of the vehicle, a series of local tensile strength maxima is formed with increasing tensile strength in a direction of an acting force at a vehicle front or a vehicle rear.

13. The vehicle component according to claim 1, wherein the vehicle component is arranged along a vertical axis in the vehicle and the localized deformation zone has a plurality of local tensile strength maxima in a direction that is transverse to a direction of travel of the vehicle, and wherein an amount of the plurality of local tensile strength maxima increases within the localized deformation zone with respect to a vehicle height.

14. The vehicle component according to claim 1, wherein the component body is formed in a longitudinal direction, and wherein the localized deformation zone has a cross-sectional length in the longitudinal direction, wherein the cross-sectional length corresponds to at least 0.2 times a component body length in the longitudinal direction.

15. The vehicle component according to claim 1, wherein an area of the localized deformation zone on the body surface corresponds to at least 0.05 to 0.4 times an area of the body surface.

16. A vehicle component for a vehicle, comprising:
a component body formed from a core material, wherein the component bod has a localized deformation zone arranged flat in the core material, wherein the localized deformation zone has a locally variable tensile strength according to a tensile strength profile configured to influence a deformation profile of the component body upon a force acting on the component body,
wherein the localized deformation zone has a first tensile strength profile and a second tensile strength profile, wherein each of the first tensile strength profile and the second tensile strength profile extends along a straight surface cross section comprising a center of the localized deformation zone, and wherein each of the first tensile strength profile and the second tensile strength profile corresponds to a change in tensile strength from a respective edge point of the localized deformation zone to the center of the localized deformation zone, and wherein the first tensile strength profile has a smaller maximum tensile strength change rate than the second tensile strength profile.

* * * * *